United States Patent

Ericson

Patent Number: 5,836,345
Date of Patent: Nov. 17, 1998

[54] VACUUM BREAKER VENT VALVE PACKAGING AND INSTALLATION SYSTEM

[75] Inventor: Kurt S. B. Ericson, Schilde, Belgium

[73] Assignee: Studor Trading Ltd., Dunedin, Fla.

[21] Appl. No.: 7,919

[22] Filed: Jan. 16, 1998

Related U.S. Application Data

[62] Division of Ser. No. 609,712, Mar. 1, 1996, Pat. No. 5,725,099.

[51] Int. Cl.⁶ .................................................... B65D 51/16
[52] U.S. Cl. ........................................... 137/382; 137/526
[58] Field of Search .................................... 137/526, 377, 137/382

[56] References Cited

U.S. PATENT DOCUMENTS

| | | | |
|---|---|---|---|
| 367,324 | 7/1887 | Shields | 137/526 |
| 1,497,726 | 6/1924 | Keenan | 137/382 |
| 2,029,955 | 2/1936 | Taylor | 137/382 |
| 2,872,938 | 2/1959 | Hansen. | |
| 2,928,413 | 3/1960 | Hansen. | |
| 4,232,706 | 11/1980 | Ericson. | |
| 4,440,406 | 4/1984 | Ericson. | |
| 4,535,807 | 8/1985 | Ericson. | |
| 4,556,084 | 12/1985 | Frawley. | |
| 4,886,085 | 12/1989 | Miller. | |
| 4,991,623 | 2/1991 | Ericson. | |
| 4,998,554 | 3/1991 | Rogers | 137/526 |
| 5,273,068 | 12/1993 | Duren | 137/526 |
| 5,429,152 | 7/1995 | Van Straaten | 137/382 |

*Primary Examiner*—John Rivell
*Assistant Examiner*—Ramyar Farid
*Attorney, Agent, or Firm*—Larson & Larson, P.A.; Herbert W. Larson

[57] ABSTRACT

A vacuum breaker vent valve is disclosed along with a coupler device and the packaging designed to enclose the valve and the coupler device. As packaged, the valve stem is received within the coupler device and the packaging, in two halves, is fastened above and below the valve and coupler device to enclose them. In use, the coupler device is inverted and attached to a sanitary system pipe and the valve is coupled on the coupler device. The packaging halves are assembled over the valve to provide protection.

9 Claims, 5 Drawing Sheets

VACUUM BREAKER VENT VALVE PACKAGING AND INSTALLATION SYSTEM

This application is a divisional from application Ser. No. 08/609,712 Mar. 1, 1996, now U.S. Pat. No. 5,725,099.

BACKGROUND OF THE INVENTION

The present invention relates to a vacuum breaker vent valve packaging and installation system. In the prior art, vacuum breaker vent valves are known. However, Applicant is unaware of any such device that is packaged by packaging means that may also be employed as a protective housing mountable in surrounding relation to the valve, in situ, to protect the valve at its point of installation.

Description of Prior Art

The following prior art is known to Applicant:

U.S. Pat. No. 2,872,938 to Hansen et al.
U.S. Pat. No. 2,928,413 to Hansen
U.S. Pat. No. 4,232,706 to Ericson
U.S. Pat. No. 4,440,406 to Ericson
U.S. Pat. No. 4,535,807 to Ericson
U.S. Pat. No. 4,556,084 to Frawley
U.S. Pat. No. 4,886,085 to Miller
U.S. Pat. No. 4,991,623 to Ericson.

None of these patents teaches or contemplates a protective covering for a vacuum breaker vent valve nor the concept of such a protective covering also employed as a packaging device enclosing and surrounding the valve and coupler device at the point of sale.

SUMMARY OF THE INVENTION

The present invention relates to a vacuum breaker vent valve packaging and installation system. The present invention includes the following interrelated objects, aspects and features:

(1) In a first aspect, the vacuum breaker vent valve is of conventional design such as that which is disclosed, for example, in Applicant's prior U.S. Pat. No. 4,535,807, including a valve body having a lower hollow stem terminating in an upwardly facing lip and having an upper cover enclosing a space vented by an annular vent valve that seats on the lip. The inventive system also includes a coupler device consisting of a first coupling designed to be attachable over a vent pipe and a second coupling designed to couple with the hollow stem of the vent valve.

(2) The packaging system consists of two housing halves that fit together to enclose the vent valve and coupler device so that they may be packaged through use of a wrapper wrapped about the exterior thereof, with the wrapper having printed thereon information concerning the inventive system.

(3) After the vent valve and coupler device have been employed to install the vent valve on a vent pipe, the housing halves may be employed to create a housing enclosing the vent valve to protect it.

As such, it is a first object of the present invention to provide a vacuum breaker vent valve packaging and installation system.

It is a further object of the present invention to provide such a device including packaging also employable as a protective insulating housing.

It is a still further object of the present invention to provide such a device wherein a coupler device is provided to allow coupling of a vent valve to a vent pipe.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
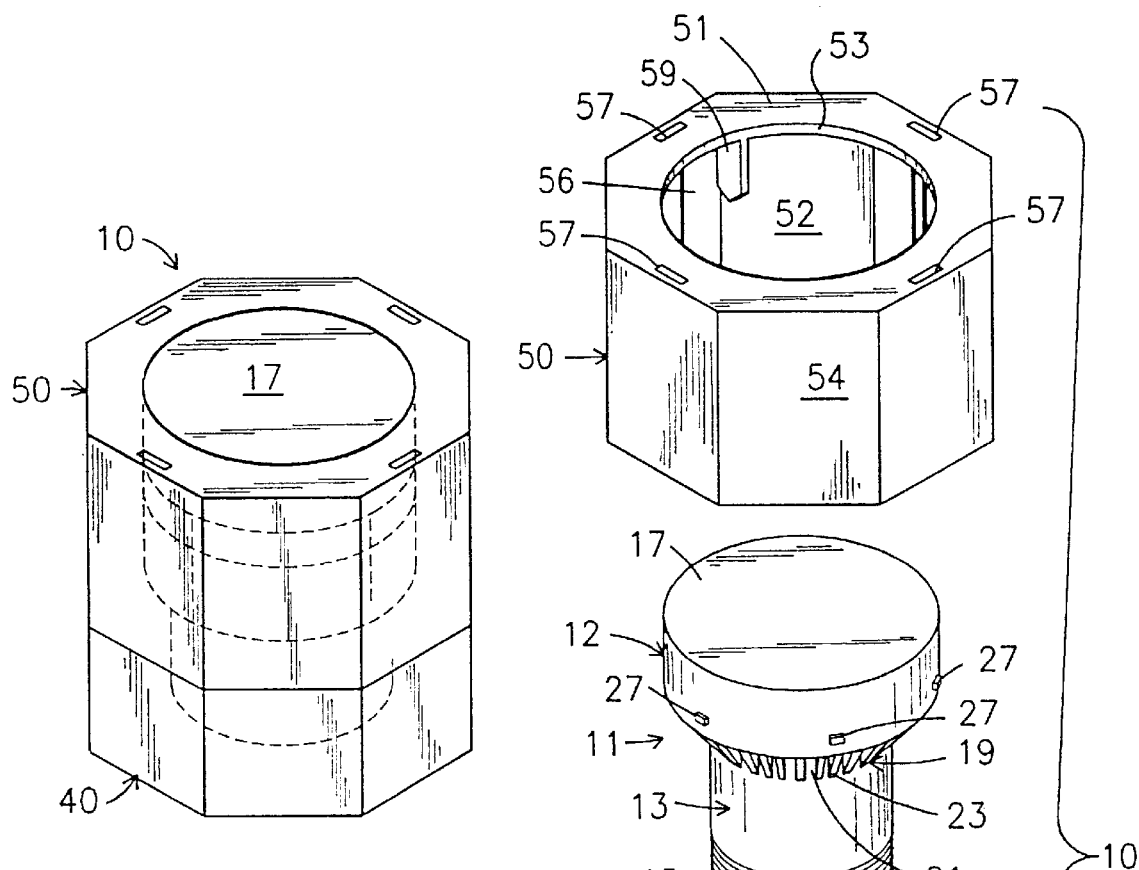
FIG. 1 shows a perspective view of the inventive system as packaged with certain features shown in phantom.
Figure 2:
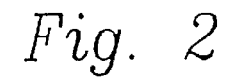
FIG. 2 shows an exploded perspective view depicting all components of the inventive system.
Figure 3:
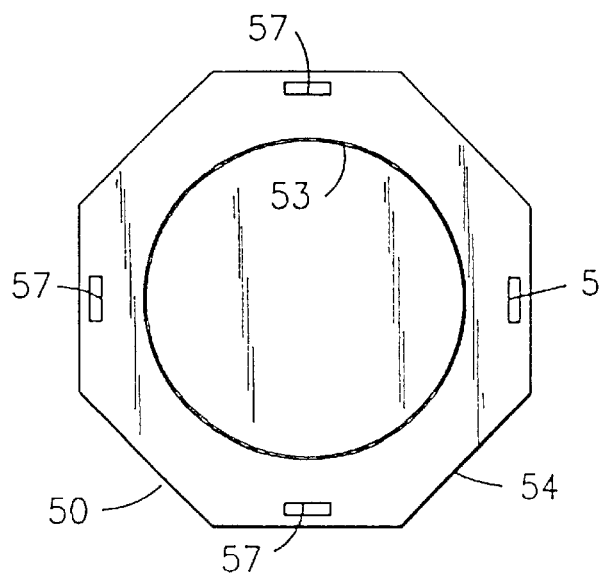
FIG. 3 shows a top view of the upper housing half seen in FIG. 2.
Figure 7:
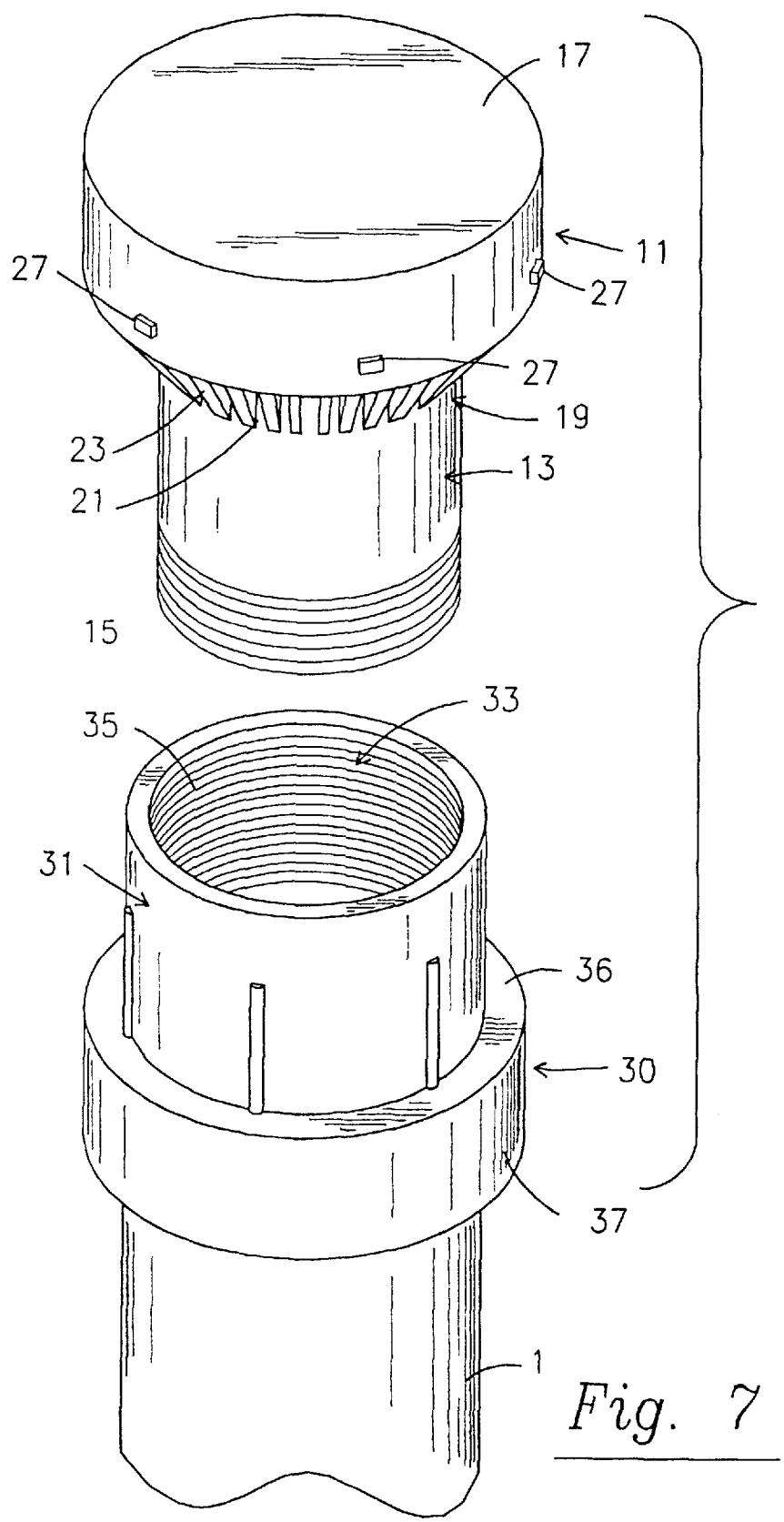
FIG. 7 shows a perspective view of the coupler device of the inventive system as mounted on a vent pipe with the vent valve thereof suspended over the coupler device prior to installation.
Figure 8:
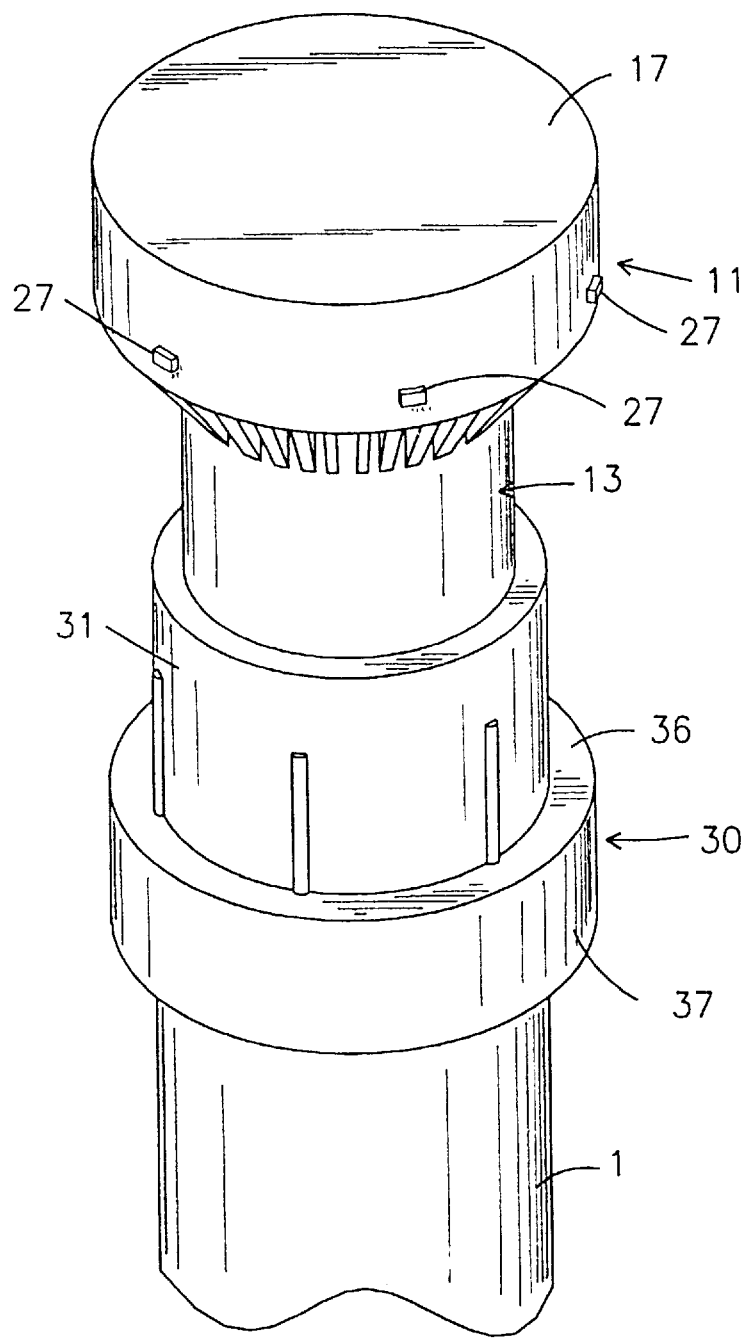
FIG. 8 shows a perspective view similar to that of FIG. 7 but showing the vent valve installed on the coupler device.
Figure 9:
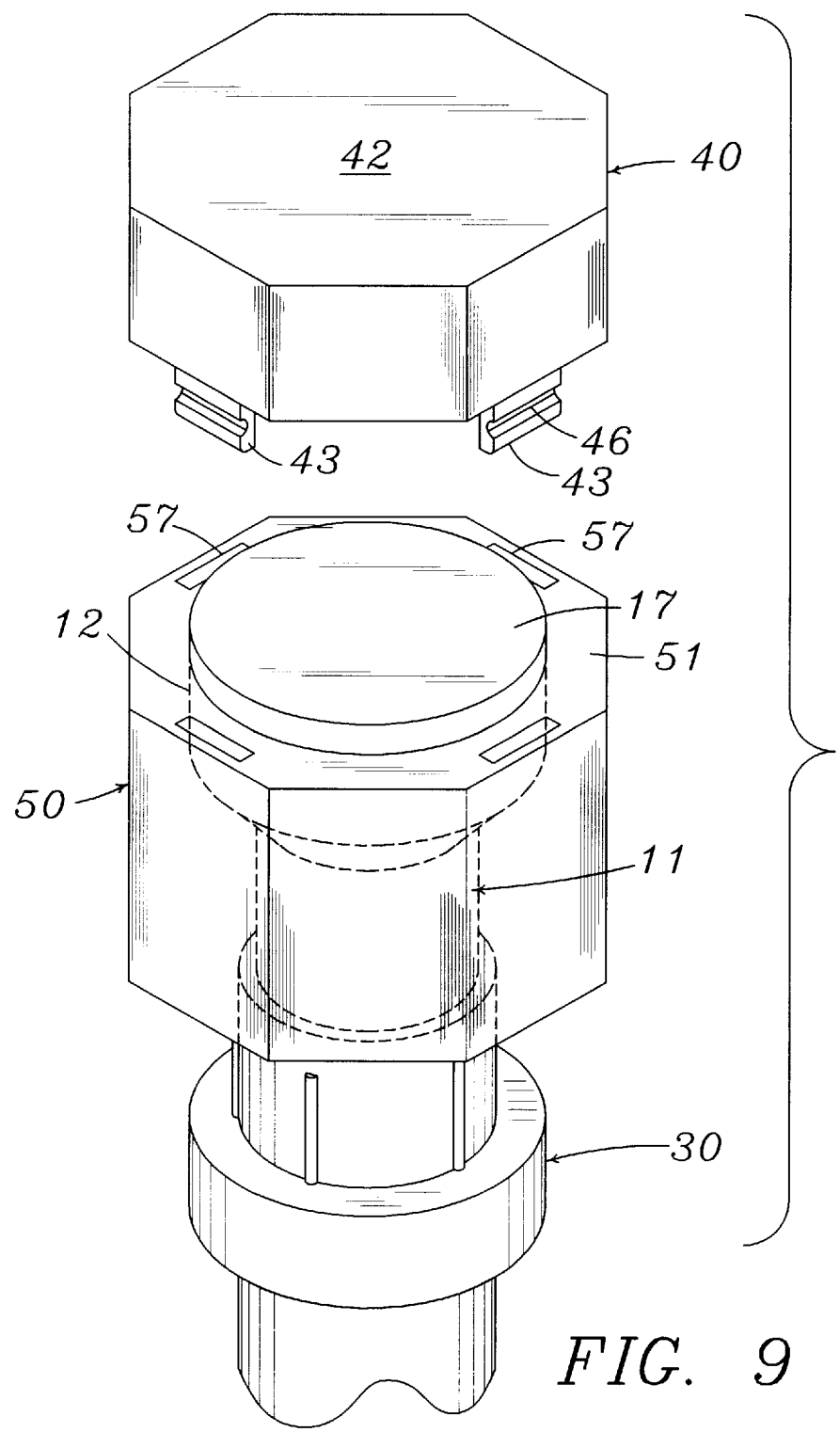
FIG. 9 shows a perspective view similar to that of FIG. 8 but with the upper housing half from FIG. 2 shown mounted over the vent valve and with the lower housing half from FIG. 2 inverted and suspended over the upper housing half.

With reference to FIGS. 1 and 2, the inventive system is generally designated by the reference numeral 10 and is seen to include a vent valve 11 having a housing 12 including a hollow lower stem 13 with a lower threaded exterior 15, a cap 17 integrally connected to the stem 13 via an annular portion 19 having a series of openings 21 separated by ribs 23 that interconnect the stem 13 and the cap 17. A valve disk (not shown) sits on a valve seat (not shown) to control venting of air from the exterior through the openings 21 and into a vent pipe 1 (FIGS. 7–9). The vent valve 11 is of conventional design and may be made in accordance with the teachings of Applicant's prior U.S. Pat. No. 4,535,807.

Figure 10:
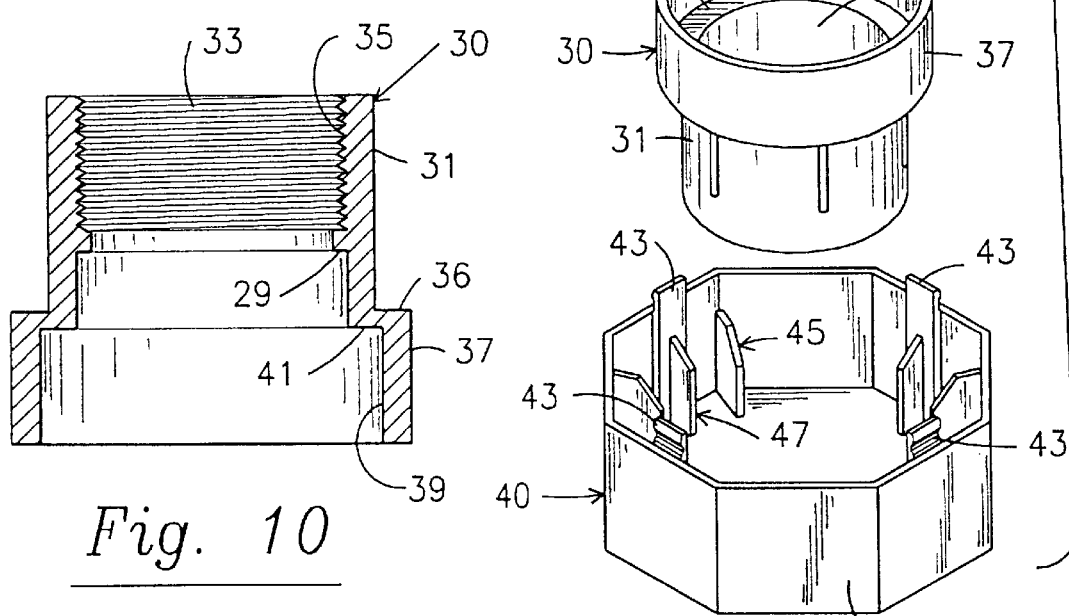
FIG. 10 shows an inverted sectional view in elevation of the coupler shown in FIG. 2.

With reference to FIGS. 2, 7 and 10, a coupler device is generally designated by the reference numeral 30 and, with particular reference to FIG. 7, includes a first upper coupling 31 having an internal passageway 33 carrying internal threads 35 complementary to the external threads 15 of the stem 13 of the vent valve 11. With further reference to FIGS. 2, 7 and 10, the coupler device 30 has a second lower coupling 37 integrally connected to the upper coupling at a shoulder 36. With reference to FIGS. 2 and 10, the lower coupling 37 has an interior wall 39 that is smooth and terminates at a shoulder 41 which receives the end of a standard two inch pipe. Shoulder 29 receives the end of a one and one-half inch pipe. As seen in FIG. 2, when the coupler device 30 is packaged together with the vent valve 11, the coupler device 30 is inverted so that the stem 13 of the vent valve 11 may be received within the wall 39 of the lower coupling 37 with the stem 13 protruding into the upper coupling 31 to conserve space in the package as best shown with reference to the phantom lines of FIG. 1.

Figure 5:
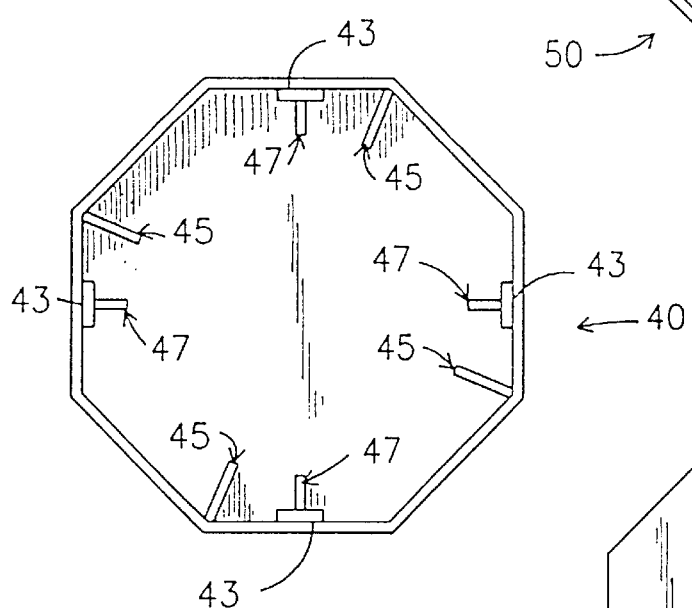
FIG. 5 shows a top view of the lower housing half depicted in FIG. 2.
Figure 6:
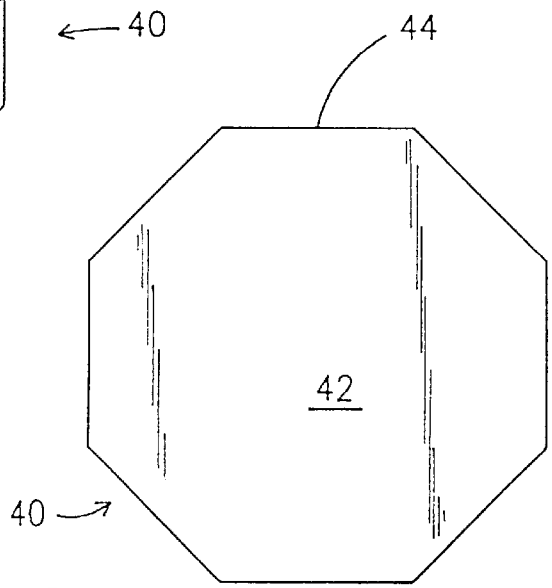
FIG. 6 shows a bottom view of the lower housing half.

With reference to FIGS. 1, 2, 5 and 6, the lower housing half is generally designated by the reference numeral 40 and is seen to include a closed bottom wall 42 (FIG. 6) and is upwardly open as best seen in FIGS. 2 and 5. The outer peripheral wall of the lower housing half 40 is generally designated by the reference numeral 44. The lower housing half 40 is of generally octagonal configuration as best seen in FIGS. 5 and 6 and includes legs 43 for a purpose to be described in greater detail hereinafter. Tabs 45 and 47 are strengthening members.

Figure 4:
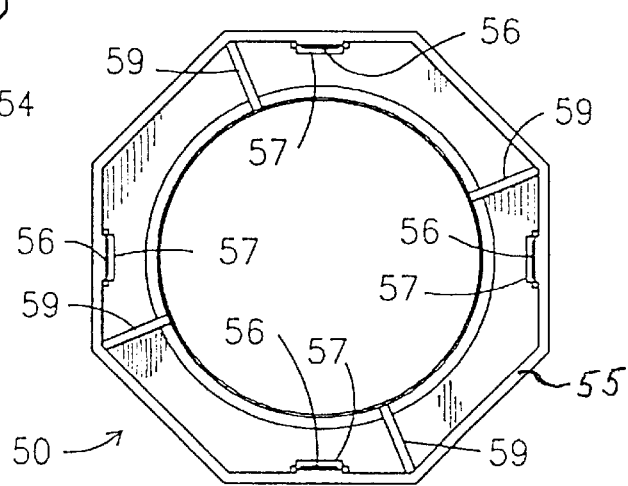
FIG. 4 shows a bottom view of the upper housing half.

With reference to FIGS. 1, 2, 3 and 4, in particular, an upper housing half is designated by the reference numeral 50 and is seen to be generally octagonal in outer configuration (FIG. 3 and 4) including an upper wall 51 having a central opening 53 therethrough and having an octagonal bottom wall 55 (FIG. 4). The upper wall 51 has four slots 57 therethrough for a purpose to be described in greater detail hereinafter as well as four ribs 59 which attach between the inner wall 52 of the housing half 50 and the underside of the top wall 51 and are used to frictionally engage cap 17 as it is contained within the package 10. The octagonal outer periphery of the upper housing half 50 is generally designated by the reference numeral 54. The bottom wall 55 has four inwardly extending vertical channels 56 provided for a purpose to be described in greater detail hereinafter.

As explained above, FIG. 1 and 2 explain the orientation of the various components of the present invention as they are packaged for sale. In packaged configuration, the locking structures 46 (FIG. 9.) on the legs 43 of the housing half 40 engage the wall channel 56 of the housing half 50 to releasably lock them together.

With reference to FIG. 7, in order to install the inventive system on a vent pipe 1, the vent valve 11 is removed from the coupler device 30 and the coupler device 30 is inverted to the position shown in FIG. 7 whereupon the smooth inner surface 39 of the coupling 37 is placed over the outer surface of the vent pipe 1. Suitable adhesive (not shown) may be employed to adhere the coupling 37 over the end of the vent pipe 1. Different size diameter pipes will fit within coupler device 30. Thereafter, with reference to FIGS. 7 and 8, the vent valve 11 is installed on the coupler device 30 by threading the stem 13 thereof into the internal threads 35 of the coupling 31 until the vent valve 11 is installed on the coupler device 30 in the manner shown in FIG. 8.

Thereafter, with reference to FIG. 9, the upper housing 50, in the same orientation as shown in FIG. 2, is placed over the vent valve 11 and is lowered to the position shown in FIG. 9 with cap 17 protruding through opening 53. Dimples 27 on a lower portion of cap 17 prevent the cap from being pushed too far through opening 53. The bottom of the vent valve 11 is enclosed within housing 50. Four ribs 59 hold cap 17 in a friction fit during transport as the package is shown in FIG. 1. Thereafter, with reference to FIGS. 2 and 9, the lower housing half 40 is inverted from the position shown in FIG. 2 and is lowered over the upper housing 50 with the legs 43 thereof entering respective ones of the slots 57 of the upper housing half 50. FIG. 9 clearly shows locking structure 46 on each leg 43 causing each leg 43 to snap into a locked position within a respective slot 57 to complete the assembled system. As shown, the housing halves 40 and 50 completely enclose the vent valve 11 to protect it against the elements and to provide insulation from cold temperatures. The open bottom of the housing half 50 allows complete access to the ambient air for the vent valve 11.

In the preferred embodiment of the present invention, the various components of the present invention may be made of any suitable material such as, for example, hard molded plastic.

A paper enclosure (not shown) around the packaged system as shown in FIG. 1 assists in holding the two housing halves together and is used to provide mounting instructions, trademarks and seller identification codes.

As such, an invention has been disclosed in terms of a preferred embodiment thereof which fulfills each and every one of the objects of the invention as set forth hereinabove and provides a new and useful vacuum breaker vent valve packaging and installation system of great novelty and utility.

Of course, other types of valves may be packaged in a substantially similar way. Various changes, modifications and alterations in the teachings of the present invention may be contemplated by those skilled in the art without departing from the intended spirit and scope thereof.

As such, it is intended that the present invention only be limited by the terms of the appended claims.

I claim:

1. In a vacuum breaker vent valve having a valve cap integrally connected to a hollow stem connectable through a coupler to a vent pipe and a valve opening adapted to fluidly connect said stem to ambient air, the improvement comprising first and second half protective housing mountable over said valve cap and hollow stem in surrounding relation thereto, said first half protective housing having a bottom opening permitting ambient air to enter said valve opening, said second half mounted over the first housing half and the valve cap protruding through a top opening in the first housing half, the first housing half engaging multiple dimples on an annular side surface of the valve cap to prevent the valve cap from being pushed through the top opening.

2. The valve of claim 1, wherein said first and second half protective housing are assembled together over said valve cap.

3. The valve of claim 1, wherein said first housing half further including an upper surface surrounding the top opening having at least one slot therein.

4. The valve of claim 1, wherein said second housing half has at least one downwardly depending leg adapted to be received in said at least one slot to lock said housing halves together.

5. The valve of claim 2, including a plurality of slots and a corresponding plurality of legs.

6. The valve of claim 5, each of said housing halves having a generally octagonal periphery.

7. The valve of claim 6, wherein said coupler has a first coupling adapted to be threadably coupled to said hollow stem and a second coupling adapted to be coupled to a vent pipe.

8. The valve of claim 7 wherein the coupler is adapted to be coupled to a vent pipe of varying diameter.

9. A vacuum breaker vent valve having a valve cap integrally connected to a hollow stem threadably engaged to a coupler connected to a vent pipe, a first housing half mounted over the valve cap with the valve cap protruding through an opening in a top surface of the first housing half, the valve cap having dimples on an annular side surface engaging the first housing half to prevent the valve cap from going completely through the top opening in the first housing half, multiple slots on the top surface of the first housing half to receive legs protruding from a bottom edge of a second housing half so that an insulating space is formed over the valve cap.

* * * * *